(12) United States Patent
Childers

(10) Patent No.: US 7,069,715 B1
(45) Date of Patent: Jul. 4, 2006

(54) METHOD AND APPARATUS FOR THE PRE-HEATING OF VAPORIZATION CHAMBER

(75) Inventor: Philip D. Childers, Bixby, OK (US)

(73) Assignee: Express Integrated Technologies LLC, Tulsa, OK (US)

( * ) Notice: Subject to any disclaimer, the term of this patent is extended or adjusted under 35 U.S.C. 154(b) by 154 days.

(21) Appl. No.: 10/680,573

(22) Filed: Oct. 7, 2003

(51) Int. Cl.
*F02C 7/00* (2006.01)

(52) U.S. Cl. .................. 60/39.5; 219/440; 392/459

(58) Field of Classification Search ............. 60/39.182, 60/39.5, 39.53, 772, 775; 423/239.1; 219/440; 392/458, 459, 460
See application file for complete search history.

(56) References Cited

U.S. PATENT DOCUMENTS

| | | | | |
|---|---|---|---|---|
| 1,244,817 A | * | 10/1917 | Wilson | ....................... 219/526 |
| 2,797,296 A | * | 6/1957 | Fowler et al. | ............... 219/528 |
| 5,098,680 A | * | 3/1992 | Fellows et al. | ............. 423/235 |
| 5,282,355 A | * | 2/1994 | Yamaguchi | .................. 60/39.5 |
| 5,296,206 A | * | 3/1994 | Cho et al. | .................... 423/235 |

\* cited by examiner

Primary Examiner—Louis J. Casaregola
(74) Attorney, Agent, or Firm—LaRiviere, Grubman & Payne, LLP

(57) ABSTRACT

The present invention is generally directed toward an apparatus and method for the heating of vaporized aqueous mixture, more specifically toward the pre-heating a vaporization chamber. In a power plant utilizing a cleaning process, such as a selective catalytic reduction (SCR) process, or other type of process, to remove harmful components, such as nitrous oxide ($NO_x$), from a stream of flue gas wherein the cleaning process includes the injection of vaporized aqueous mixture into the stream of flue gas, the present invention comprises a vaporizing chamber having a heat source to facilitate the heating and subsequent vaporization of the ammonia.

4 Claims, 2 Drawing Sheets

METHOD AND APPARATUS FOR THE PRE-HEATING OF VAPORIZATION CHAMBER

REFERENCE TO PENDING APPLICATIONS

This application is not based upon any pending domestic or international patent applications.

REFERENCE TO MICROFICHE APPENDIX

This application is not referenced in any microfiche appendix.

FIELD OF THE INVENTION

The present invention is generally directed toward an apparatus and method for the heating of vaporized ammonia. More specifically, the present invention is directed toward an apparatus and method for the pre-heating of a vaporization chamber.

BACKGROUND OF THE INVENTION

One of the byproducts of gas turbine engines used in power plants are exhaust gases, commonly known as flue gas, containing components which are harmful to the atmosphere such as oxides of nitrogen, ($NO_x$). To prevent harm to the atmosphere and to the power plant itself, the levels of these harmful components must be controlled. Accordingly, various methods and processes have been developed for the reduction of these harmful components. A principal process for the removal of $NO_x$ from the flue gas is the injection of a reducing agent such as ammonia or any of a number of other known reducing agents. A common method is the selective catalytic reduction (SCR) process which involves the injection of ammonia (NH3) in the flue gas and then passing the flue gas over a catalyst. SCR processes are based on the reaction of $NO_x$ with ammonia in the presence of a catalyst to form nitrogen and water. These methods are effective within a narrow flue gas temperature window.

One traditional method of injecting into the flue gas stream uses an external ammonia vaporization system in which liquid ammonia, in an aqueous mixture, is first vaporized in a vaporization chamber and then routed to a distribution grid network for subsequent injection into the flue gas stream at a location upstream of an SCR reactor. The aqueous mixture is a mixture of combination of ammonia and water.

Areas of concern regarding the SCR process include ammonia breakthrough and a narrow operating temperature window. To address these concerns, it has been discovered that the aqueous mixture which has been heated to an operational temperature sufficient to cause vaporization, allows the SCR process to function.

The aqueous mixture is vaporized in a pre-heated vaporization chamber, prior to its introduction into the flue gas stream via the distribution grid network. If the aqueous mixture is introduced into the vaporization chamber prior to the time the vaporization chamber is pre-heated to the vaporization temperature, the aqueous mixture will not vaporize and will be introduced into the distribution grid network in a liquid state and will not be effective. It is, therefore, critical the vaporization chamber be pre-heated to a vaporization temperature prior to the introduction of the aqueous mixture.

The time needed to pre-heat a vaporization chamber is critical especially when its associated power plant will be called upon to provide electrical power within a short time frame. Thus, it is critical that the vaporization chamber be pre-heated to a vaporization temperature as quickly as possible.

The prior art typically heats the vaporization chamber through a convection process which uses a diffuser fan and an electric heater to blow hot air into the vaporization chamber. This process is very time consuming. Typically, the convection process takes longer to heat the vaporization chamber than the time to prepare the power plant's gas turbine engine. Thus, the power plant must wait for the vaporization chamber to pre-heat prior to becoming operational. Accordingly, there is a need for a system to provide for a more efficient and effective pre-heating of a vaporization chamber.

BRIEF SUMMARY OF THE INVENTION

The present invention satisfies the needs discussed above. The present invention is generally directed toward an apparatus and method for the heating of vaporized ammonia, more specifically toward the pre-heating of a vaporization chamber.

In a power plant utilizing a process to remove components which are harmful to the atmosphere such as oxides of nitrogen, ($NO_x$) from a stream of flue gas wherein the process includes the injection of vaporized ammonia into the stream of flue gas, one aspect of the present invention comprises a vaporization chamber having a heat source to facilitate the heating and subsequent vaporization of an aqueous mixture containing, in part, ammonia.

In the power plant described above, another aspect of the present invention comprises a selective catalytic reduction (SCR) process which involves the injection of ammonia (NH3) in the stream of flue gas which passes over a catalyst.

In the power plant described above, another aspect of the present invention comprises a vaporization chamber being heated by an independent heat source, such as but not limited to a band heater, a blanket heater, a steam heat tracing apparatus or an electrical heat tracing apparatus. While the above heat sources are mentioned, they are not mint to be limiting but are merely illustrative. Those skilled in the art would understand that other heat sources could be utilized.

In the power plant described above, yet another aspect of the present invention comprises a vaporization chamber being initially pre-heated by a heat source until such time as a vaporization temperature has been achieved. Thereafter, a convection process is utilized to maintain this vaporization temperature.

Further objects and features of the present invention will be apparent to those skilled in the art upon reference to the accompanying drawings and upon reading the following description of the preferred embodiments.

DETAILED DESCRIPTION OF THE PREFERRED EMBODIMENTS

The present invention is generally directed toward an apparatus and method for the heating of vaporized ammonia, more specifically toward the pre-heating a vaporization chamber.

Figure 1:
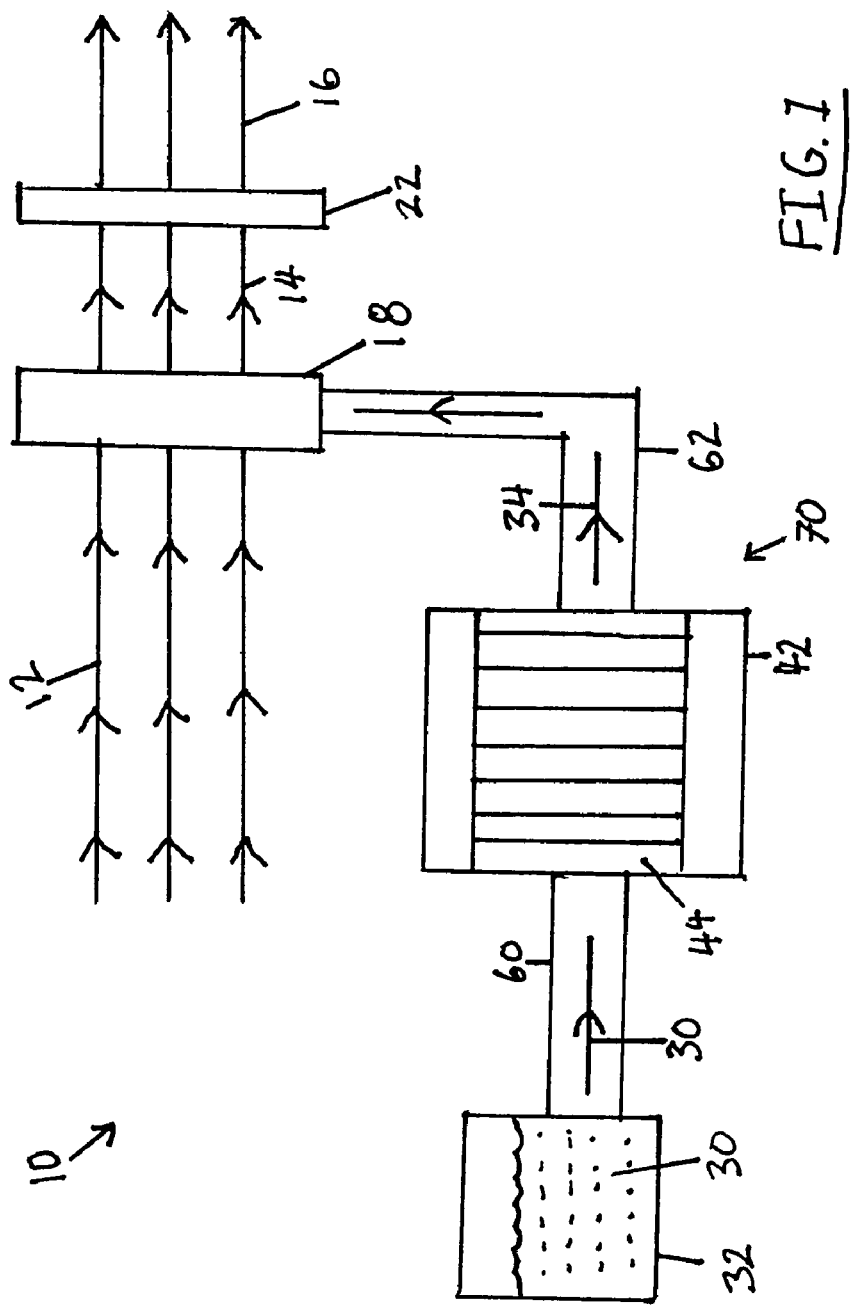
FIG. 1 is a schematic view of an aqueous mixture distribution network contained within a power plant exhaust duct system incorporating an embodiment of the inventive vaporization chamber therein.

As illustrated in FIG. 1, a schematic of an embodiment 10 of power plant having an embodiment of an inventive vaporization chamber assembly 70. The vaporization chamber assembly 70 is part of a power plant which utilizes a selective catalytic reduction (SCR) process to remove components which are harmful to the atmosphere such as oxides of nitrogen (NOx) from a stream of flue gas 12. The use of the SCR process is not limiting but is merely illustrative. This process involves introducing an aqueous mixture in a vaporized state 34 and containing, in part, ammonia into the stream of flue gas 12 having atmospherically harmful components through a distribution grid network 18. The flue gas/aqueous mixture flow 14 then passing over a catalyst 22. The resulting flow 16 has a reduced amount of atmospherically harmful components therein.

Vaporization chamber assembly 70 is shown to include a vaporization chamber 42 having a heat source 44, such as a band heater. The mention of a band heater is merely illustrative and is not meant to be limiting. Those skilled in the art will understand and appreciate other heat sources can be used with the present invention. Heat source 44 heats the vaporization chamber to a temperature sufficient to vaporize the aqueous mixture, otherwise known as a vaporization temperature. Vaporization chamber 42 additionally has an inflow 60 for receiving the aqueous mixture in a liquid state 30 from a storage unit 32 and an outflow 62 for providing the aqueous mixture in a vaporized state 34 to the distribution grid network 18 for mixing with the flue gas 12.

Figure 2:
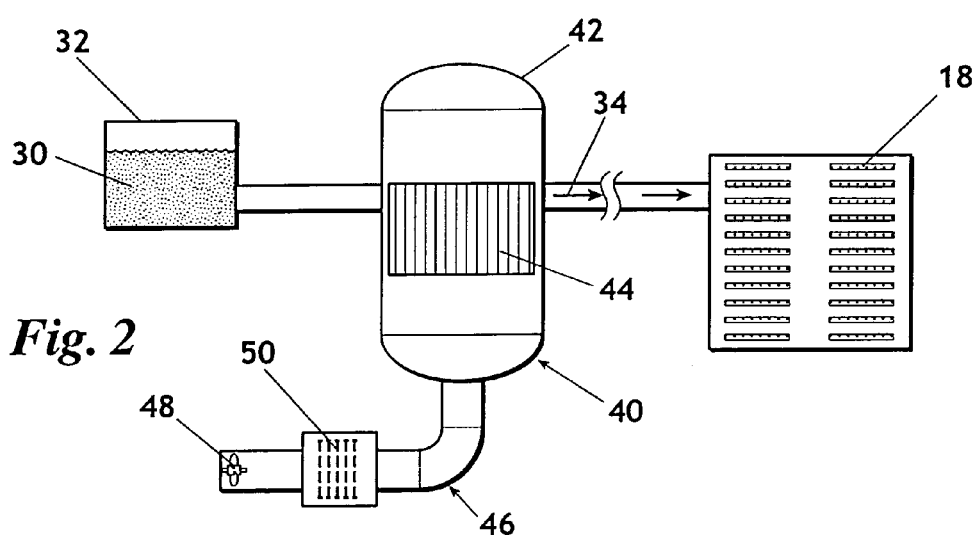
FIG. 2 is a schematic view of an aqueous mixture distribution network contained within a power plant exhaust duct system incorporating an embodiment of the inventive vaporization chamber therein.

Illustrated in FIG. 2 is an embodiment 40 of the present invention for heating the aqueous mixture 30 into a vaporized condition comprising a vaporization chamber 42 which is heated by an band heater 44. The use of band heater 44 is merely illustrative and is not ment to be limiting. Those skilled in the art will understand and appreciate other heat sources can be used with the present invention. The aqueous mixture 30 is initially stored in a storage unit 32. Once the vaporization chamber 42 is pre-heated to a vaporization temperature, aqueous mixture is introduced into the vaporization chamber 42 and heated to a vaporized state. Air assembly 46 pressurizes the vaporized aqueous mixture. This vaporized/pressurized mixture 34 is introduced into a distribution grid network 18 aspect of the duct assembly 10 where it is introduced into the stream of flue gas 12.

An embodiment of air assembly 46 comprises a diffusing fan 48 in communication with an electric heater 50. The prior art utilizes the air assembly 46 to pre-heat the vaporization chamber 42 through a convection process. This process is time consuming and not efficient. The use of a diffusing fan/electric heater is for illustrative purposes and is not meant to be limiting.

Figure 3:
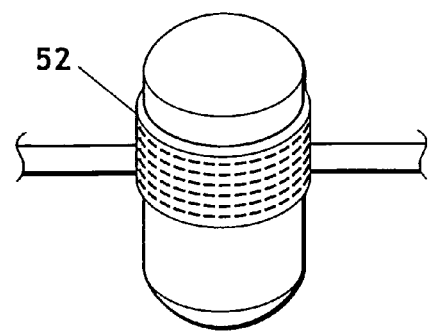
FIG. 3 is a schematic view of an embodiment of the inventive vaporization chamber.
Figure 4:
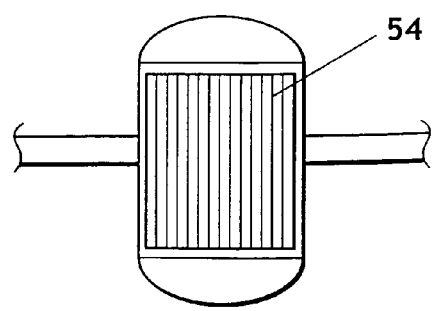
FIG. 4 is a schematic view of an embodiment of the inventive vaporization chamber.

Additional embodiments of the independent heat source used to heat vaporization chamber 42 a heat tracing unit 52 (FIG. 3) and a blanket heater 54 (FIG. 4). These embodiments are merely illustrative and not meant to be limiting.

An embodiment of the method to heat an aqueous mixture to an operation temperature comprises pre-heating a vaporization chamber to a vaporization temperature by way of an independent heat source and then introducing an aqueous mixture into the pre-heated vaporization chamber where it is subsequently heated to an operational temperature and vaporized.

Another embodiment of the method to heat an aqueous mixture comprises pre-heating a vaporization chamber to a vaporization temperature by way of an independent heat source, introducing an aqueous mixture into the pre-heated vaporization chamber where it is subsequently heated to an operational temperature and vaporized and then maintaining the vaporization chamber at a vaporization temperature via a convection process.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claims, including the full range of equivalency to which each element thereof is entitled.

What is claimed is:

1. A vaporization chamber assembly utilized in a power plant utilizing a process to remove components harmful to the atmosphere from a stream of flue gas, wherein said process includes the injection of a vaporized aqueous mixture in the stream of flue gas by way of a distribution grid, said vaporization chamber assembly comprising:

a vaporization chamber having an inlet for receiving an aqueous mixture, a heat source for heating said vaporization chamber to a temperature sufficient to vaporize said aqueous mixture, an air assembly in communication with said vaporization chamber for pressurizing said aqueous mixture in a vaporized state, and an outlet for providing said vaporized aqueous mixture to said distribution grid.

2. The vaporization chamber assembly according to claim 1 wherein said heat source is a band heater.

3. The vaporization chamber assembly according to claim 1 wherein said aqueous mixture comprises ammonia in the range of less than 29% by volume and the balance being water.

4. The vaporization chamber assembly according to claim 1, said air assembly comprising a diffusing air fan in communication with an electric heater.

* * * * *